(12) United States Patent
Kang et al.

(10) Patent No.: US 9,796,159 B2
(45) Date of Patent: Oct. 24, 2017

(54) ELECTRIC FIELD ACTIVATED SHAPE MEMORY POLYMER COMPOSITE

(75) Inventors: Jin Ho Kang, Newport News, VA (US); Emilie J. Siochi, Newport News, VA (US); Ronald K. Penner, Hampton, VA (US); Travis L. Turner, Yorktown, VA (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 497 days.

(21) Appl. No.: 13/447,513

(22) Filed: Apr. 16, 2012

(65) Prior Publication Data

US 2016/0193810 A1 Jul. 7, 2016

Related U.S. Application Data

(60) Provisional application No. 61/475,342, filed on Apr. 14, 2011.

(51) Int. Cl.
*B32B 27/38* (2006.01)
*B32B 15/092* (2006.01)
(Continued)

(52) U.S. Cl.
CPC ........... *B32B 15/092* (2013.01); *B32B 15/08* (2013.01); *B32B 25/08* (2013.01); *B32B 25/20* (2013.01); *B32B 27/20* (2013.01); *B32B 27/38* (2013.01); *B32B 2264/102* (2013.01); *B32B 2264/108* (2013.01); *B32B 2307/102* (2013.01);
(Continued)

(58) Field of Classification Search
None
See application file for complete search history.

(56) References Cited

U.S. PATENT DOCUMENTS 2,234,993 A 3/1941 Vernon et al.
3,174,851 A 3/1965 Beuhler
(Continued)

FOREIGN PATENT DOCUMENTS

WO   WO 03088818 A2   10/2003
WO   WO 2007070877 A2   6/2007

OTHER PUBLICATIONS

Momentive: RapidStrength RGS7700 Structural silicone elastomeric adhesive. Sep. 2008. http://www.siliconeforbuilding.com/pdf/glazing/Data_Sheet_RGS7700_RapidStrength_Structural.pdf.*

(Continued)

*Primary Examiner* — Coris Fung
(74) *Attorney, Agent, or Firm* — Jennifer L. Riley; Thomas K. McBride, Jr.; Mark P. Dvorscak (57) ABSTRACT

Provided is an electrically activated shape memory polymer composite capable of thermal shape reformation using electric power to heat the composite through its matrix glass transition temperature. The composite includes an adaptable polymer matrix component using a diglycidyl ether resin, at least one substantially well-dispersed conductive or magnetic nano-filler component, and at least one elastic, laminated layer. Also provided are methods of preparing the composite and methods of activating the composite. A shape reformation of the composite is triggered by applying an electric field at DC and/or at a frequency above about 1 μHz for a sufficient time.

13 Claims, 10 Drawing Sheets

(51) Int. Cl.
 B32B 27/20 (2006.01)
 B32B 15/08 (2006.01)
 B32B 25/08 (2006.01)
 B32B 25/20 (2006.01)
(52) U.S. Cl.
 CPC ..... *B32B 2307/20* (2013.01); *B32B 2307/202* (2013.01); *B32B 2307/51* (2013.01); *B32B 2307/762* (2013.01); *B32B 2571/02* (2013.01); *B32B 2605/00* (2013.01); *B32B 2605/18* (2013.01)

(56) References Cited

U.S. PATENT DOCUMENTS

| | | | | |
|---|---|---|---|---|
| 5,863,988 | A * | 1/1999 | Hashimoto | C09J 109/02 427/387 |
| 6,300,464 | B2 * | 10/2001 | Morijiri | 523/427 |
| 7,743,835 | B2 | 6/2010 | Willauer | |
| 7,832,490 | B2 | 11/2010 | Willauer | |
| 8,101,689 | B2 | 1/2012 | Tong et al. | |
| 2004/0265755 | A1 * | 12/2004 | Park | B82Y 30/00 430/322 |
| 2005/0154090 | A1 * | 7/2005 | Salvino | 523/400 |
| 2006/0142472 | A1 * | 6/2006 | Hirai | C08K 3/36 524/588 |
| 2008/0213490 | A1 * | 9/2008 | Strange et al. | 427/386 |
| 2008/0269420 | A1 | 10/2008 | Tong et al. | |
| 2009/0130391 | A1 * | 5/2009 | Taya | 428/172 |
| 2010/0028686 | A1 * | 2/2010 | Xie | B29C 61/0616 428/413 |
| 2010/0125113 | A1 | 5/2010 | Xiao et al. | |
| 2010/0190011 | A1 * | 7/2010 | Cheng et al. | 428/413 |
| 2011/0086206 | A1 | 4/2011 | Scheffer et al. | |
| 2011/0088931 | A1 | 4/2011 | Lettow et al. | |

OTHER PUBLICATIONS

Zhong et al., "Graphitic Carbon Nanofiber (GCNF)/Polymer Materials. II. GCNF/Epoxy Monoliths Using Reactive Oxydianiline Linker Molecules and the Effect of Nanofiber Reinforcement on Curing Conditions". Polymer Compositesvol. 26, Issue 2, Jan. 13, 2005.*

Kim et al., Graphene/Polymer Nanocomposites, Macromolecules 2010, 43, 6515-6530. Jul. 23, 2010. http://pubs.acs.org/doi/pdf/10.1021/ma100572e.*

Richard Lin, Shape Memory Alloys and Their Applications (Lin), Feb. 22, 2008. http://web.stanford.edu/~richlin1/sma/sma.html.*

PubChem: Bisphenol A diglycidyl ether. Retrieved on Feb. 4, 2015.*

Duerig et al., Designing With the Shape Memory Effect. MRS, vol. 9, pp. 581-597 1989.*

Hissaaki Tobushi, et al., "Thermomechanical Properties in a Thin Film of Shape Memory Polymer of Polyurethane Series," Smart Mater. Struct., 1996, pp. 483-491, vol. 5, IOP Publishing Ltd., United Kingdom.

Takeru Ohki, et al., "Mechanical and Shape Memory Behavior of Composites with Shape Memory Polymer," Composites Part A: applied science and manufacturing, 2004, pp. 1065-1073, vol. 35.

Y. Liu, et al., "Thermomechanics of Shape Memory Polymer Nanocomposites," Mechanics of Materials, 2004, pp. 929-940, vol. 36.

Hilmar Koerner, et al., "Remotely Actuated Polymer Nanocomposites-Stress-Recovery of Carbon-Nanotube-Filled Thermoplastic Elastomers," Nature Materials, 2004, pp. 115-120, vol. 3.

Annette M. Schmidt, "The Synthesis of Magnetic Core-Shell Nanoparticles by Surface-Initiated Ring-Opening Polymerization of ε-Caprolactone," Macromolecular Rapid Communications, 2005, pp. 93-97, vol. 26.

Jae Whan Cho, et al., "Electroactive Shape-Memory Polyurethane Composites Incorporating Carbon Nanotubes," Macromolecular Rapid Communications, 2005. pp. 412-416, vol. 26.

Craig L. Streett, et al., "Aerodynamic Noise Reduction for High-Lift Devices on a Swept Wing Model," 44th AAIA Aerospace Sciences Meeting and Exhibit, Jan. 9-12, 2006, pp. 1-26, Reno, Nevada.

Taro Imamura, et al., "Designing of Slat Cove Filler as a Noise Reduction Device for Leading-edge Slat," AIAA Paper 2007-3473, 2007, pp. 1-17.

* cited by examiner

ELECTRIC FIELD ACTIVATED SHAPE MEMORY POLYMER COMPOSITE

CROSS-REFERENCE TO RELATED APPLICATIONS

This patent application claims the benefit of U.S. Provisional Patent Application No. 61/475,342, filed Apr. 14, 2011, which is incorporated by reference in its entirety herein.

STATEMENT REGARDING FEDERALLY SPONSORED RESEARCH AND DEVELOPMENT

This invention was made in part with Government support under Agreement Numbers NCC-1-02043 and NNL07AM07T awarded by the National Aeronautics and Space Administration. The Government may have certain rights in this invention.

BACKGROUND OF THE INVENTION

In recent years, shape memory materials (SMMs) have drawn tremendous interest due to their unique shape memory capability to be contorted from a permanent shape to a sustained temporary shape, until recovery to the permanent shape is commanded by an external stimulus. SMMs also possess other unusual, properties such as a drastic change in elastic modulus, large recoverable stroke/strain, and adaptive characteristics. These unique characteristics of SMMs enable various applications such as smart fabrics, intelligent medical devices, self-deployable space structures, morphing structures and packaging. Three different kinds of SMMs, have been studied: shape memory alloys (SMAs), shape memory ceramics (SMCs) and shape memory polymers (SMPs). The most widely used SMM is metal-based nickel-titanium alloy (e.g. Nitinol or NiTi)). Alloys or ceramic-based shape memory materials like nickel-titanium alloy or zirconia-containing ceramics exhibit outstanding shape memory effect such as large recovery stress and fast response times. However, they have drawbacks such as limited recoverable deformation, toxicity, poor mechanical strength (brittle in case of ceramics), relatively heavy weight and high fabrication cost. For this reason, shape memory polymers (SMPs) have been studied due to their intrinsically high elastic deformation (broad tailorability of mechanical properties), potential biocompatibility and biodegradability, ductility, light weight and ease of processing. Polyurethane based SMP (e.g. Diaplex, or similar segmented polyurethanes based on poly(ether-urethane) chemistry) is the most common commercial product. However, SMPs still have some critical disadvantages of monomer toxicity, insufficient mechanical and thermal characteristics for structural applications, a low recovery stress, and long response time.

BRIEF SUMMARY OF THE INVENTION

In view of the foregoing, some of the aspects(s) of the invention include providing compositions and related methods using shape memory polymers with reduced toxicity, increased mechanical and thermal characteristics for structural applications, increased recovery stress, and/or shortened response times.

It is among related aspects(s) of the invention to provide abilities to exhibit enhanced thermal/mechanical characteristics and fast response times using shape memory polymer composites having elastic layers as smart active structural materials in many applications, including without limitation as examples, for morphing vehicles/ships/submarines/spacecraft, for morphing airfoils for reduction of airframe noise, for self-deployable space structures, for smart armor with various civilian/space/military applications (large stiffness change for specific conditions), for intelligent medical devices like catheters, and for smart sensors, actuators, and switches.

These aspects are achieved by the present invention, which provides an electrically activated shape memory polymer composite capable of thermal shape reformation using electric power to heat the composite through its matrix glass transition temperature. The composite includes an adaptable polymer matrix component using a diglycidyl ether resin, at least one substantially well-dispersed conductive or magnetic nano-filler component, and at least one elastic, laminated layer. The laminated layer is a sheet such as a silicone elastomer, an elastic metal alloy, or a combination thereof. The composite is characterized with the nano-filler (such as reduced graphene oxide sheets, carbon nanotubes, and/or iron oxides) being dispersed throughout the polymer matrix, and with the matrix having at least one external side contacting the laminated layer.

In another embodiment, the invention provides a method of preparing an electrically activated shape memory polymer composite capable of thermal shape reformation using electric power to heat the composite through its matrix glass transition temperature. The method of preparing includes the various steps of: providing an adaptable polymer matrix component using a diglycidyl ether resin and a curing agent; adding into the polymer matrix component at least one conductive or magnetic nano-filler component (such as reduced graphene oxide sheets, carbon nanotubes, and/or iron oxides); conducting polymerization under sonication and mixing conditions to produce a mixture having substantially well-dispersed nano-filler component throughout the polymer matrix component; curing the mixture; laminating the cured mixture with a sheet of a silicone elastomer or elastic metal alloys; and recovering the resulting composite.

In yet another embodiment, the invention provides a method of activating a shape memory polymer composite capable of thermal shape reformation using electric power to heat the composite through its matrix glass transition temperature. The method of activating includes the step of providing a composite having an adaptable polymer matrix component using a diglycidyl ether resin, at least one substantially well-dispersed conductive or magnetic nano-filler component such as reduced graphene oxide sheets, and at least one elastic, laminated layer. The method also includes the steps of applying a DC or AC electric field above 1 µHz for a time sufficient to effect a temperature change in the composite through its glass transition temperature, and triggering a shape reformation of the composite.

Additional aspects, embodiments and details of this invention can be obtained from the following detailed description of the invention.

BRIEF DESCRIPTION OF THE SEVERAL VIEWS OF THE DRAWING(S)

FIGS. 1(a)-1(d) show a schematic diagram of a shape memory polymer composite as follows: (1a) adaptable polymer matrix, (1b) polymer matrix with nano-fillers, (1c)

polymer matrix, nano-fillers, and laminated with a high elastic layer, and (1d) multi-layered with a second elastic layer.

FIGS. 7(a)-7(b) show demonstrations of shape memory effects of (7a) programmed temporary shape of a polymer matrix without nano-fillers and (7b) original shape of the same polymer matrix recovered by external thermal radiation; (c) programmed temporary shape of a polymer matrix with nano-fillers and (d) original shape of the same polymer matrix with nano-fillers recovered by external electric field.

DETAILED DESCRIPTION OF THE INVENTION

In order to improve upon the stated limitations of conventional SMPs, the instant inventors developed a new LaRC shape memory polymer composite. First, for high mechanical and thermal characteristics, epoxy based thermosetting shape memory polymer resin was synthesized with non-toxic and non-volatile monomers, such as using diglycidyl ether as a resin, preferably using bisphenol A (or 2,2-Bis(4-glycidyloxyphenyl)propane) resin. Also used were 3,4'-oxydianyline (3,4'-ODA) and benzhydrylamine as curing agent(s) with an adequate mole ratio as known conventionally in the art. (See, for example, FIG. 1(a)). Second, for improving the response time, conductive or magnetic nanofillers like reduced graphene oxide sheets (RGO), carbon nanotubes (CNTs) or iron oxides were incorporated into the resin during polymerization (FIG. 1(b)), so a dielectric/magnetic loss heating mechanism as well as a Joule heating can be utilized to trigger shape recovery by external high-frequency AC electric field. Effective amounts of such nanofillers include about 0.1 to about 20 wt % of the resin, preferably about 1 to about 5 wt % of the resin, with about 2 wt % of the resin being especially preferred. Third, lamination with highly elastic (resilient) films such as titanium alloy sheets or silicone elastomer sheets to fabricate multilayered structures was used to ensure synergistic improvement of high recovery stress and fast response time (FIGS. 1(c) and (d)). Other types of elastic metal alloy sheets expected to show good results with use in the present invention include, e.g. Nitinol, or Ni—Ti, shape memory metal alloys.

Figures 1A, 1D:
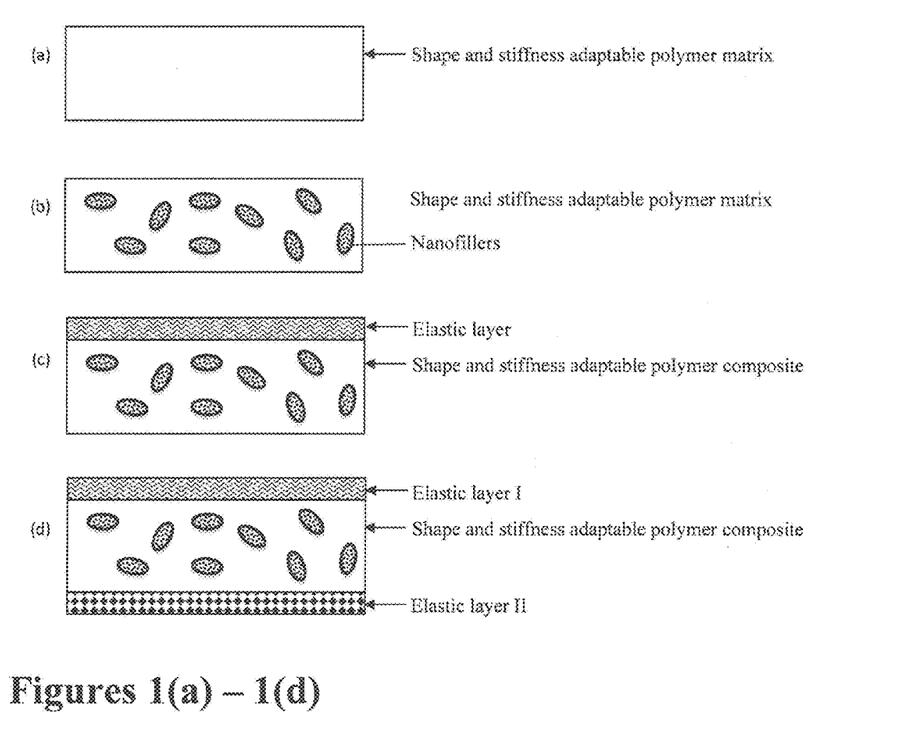
Figure 2:
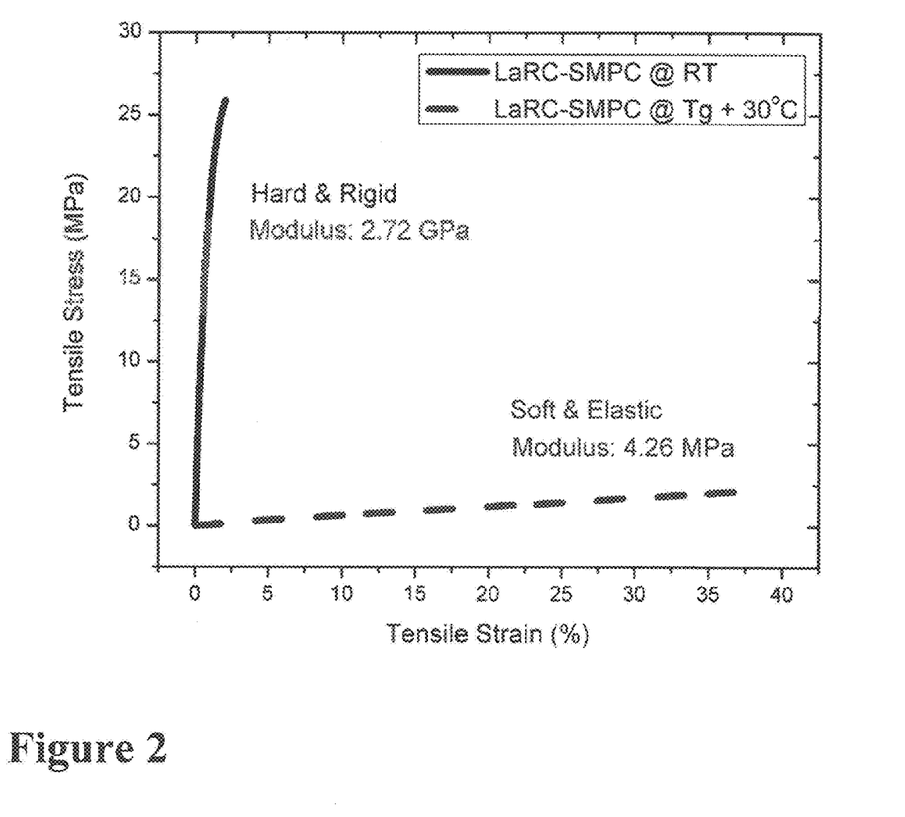
FIG. 2 shows mechanical properties of a polymer matrix with nano-fillers measured at room temperature (RT) and at elevated temperature (30° C. above the glass transition temperature).
Figure 3:
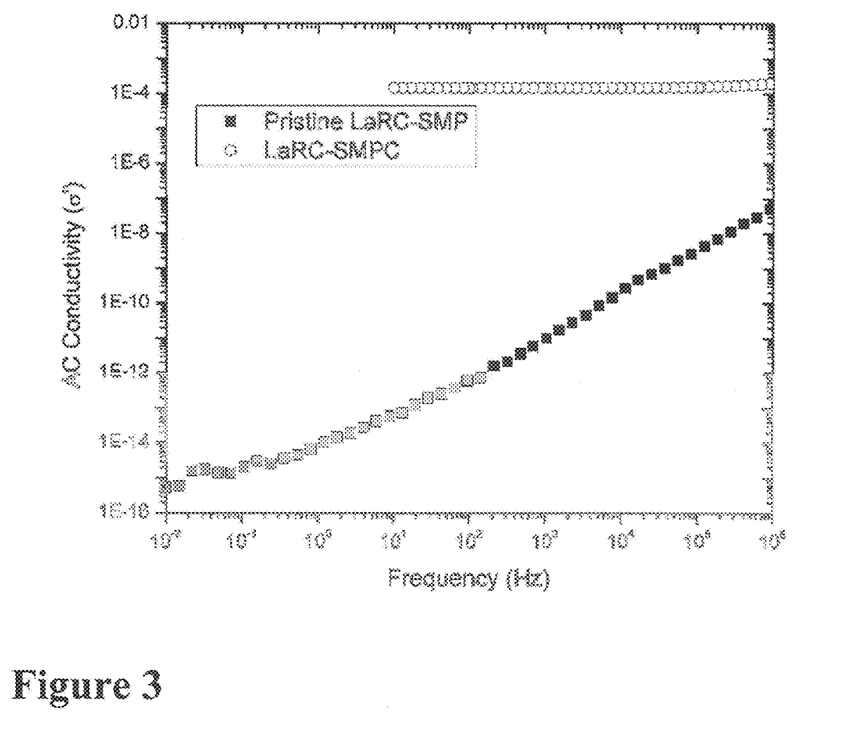
FIG. 3 shows AC conductivity as a function of frequency for a polymer matrix with nano-fillers as compared to the polymer matrix without nano-fillers (labeled, 'pristine').

In one exemplary-embodiment of the invention, with more details set forth in the Example section below, pristine epoxy based resin (or "pristine-SMP") was used with substantially well-dispersed 2 wt % RGO nano-filler, and such a nano-filled polymer matrix was employed to characterize the mechanical, thermal and electroactive properties. The RGO was commercially obtained from Vorbeck Materials Co. as reduced graphene oxide with an approximate carbon:oxygen ratio of about 70:1. In preferred instances, the graphene sheets are characterized as entirely dispersed and having a wrinkled morphology that prevents re-aggregation of single-sheets. Information and details on other RGOs within the scope of the instant invention may be found in, e.g. U.S. Patent Application Publication Nos. 2011/0086206 and 2011/0088931, which are incorporated by reference in their entirety herein. Also, the glass transition temperatures (Tg) of the pristine-SMP and the polymer with RGO were about ~96° C. each, measured by a DSC. The inventors further were able to vary the glass transition temperature from about 60° C. to about 170° C. by conventional means known to the art, such as adjusting the molar ratio of monomers to curing agent, e.g. in a range of about 0 to 0.5 molar ratios. FIG. 2 shows thermo-mechanical properties of the polymer with RGO. Tensile tests were done at room temperature and elevated temperature (Tg+30° C.), respectively. Pristine-SMP shows a hard and rigid characteristic with an elastic modulus of about 2.8 GPa and a tensile strain at break of about 6.3% at room temperature, while it exhibits a soft and elastic characteristic with an elastic modulus of only about 7.5 MPa and a tensile strain at break of higher than about 38% above the glass transition temperature (Tg+30° C.). The drastic change of elastic modulus with temperature change is a critical parameter for making a variable stiffness material. The polymer with RGO (or "LaRC-SMPC") shows a similar trend to pristine-SMP with a slight decrease of modulus. Moreover, real dielectric constant and real AC conductivity of the exemplary LaRC-SMPC were measured. The AC conductivity is shown in FIG. 3. LaRC-SMPC exhibited higher dielectric constant than pristine-SMP, and showed a large dielectric relaxation as a function of frequency, which was in contrast to the pristine-SMP that showed almost no change with frequency. Further, pristine-SMP showed lower AC conductivity relative to a conventional insulator's trend with increasing frequency, whereas conductive filler doped LaRC-SMPC exhibited higher conductivity compared to a conventional conductor's trend with increasing frequency.

Figure 4:
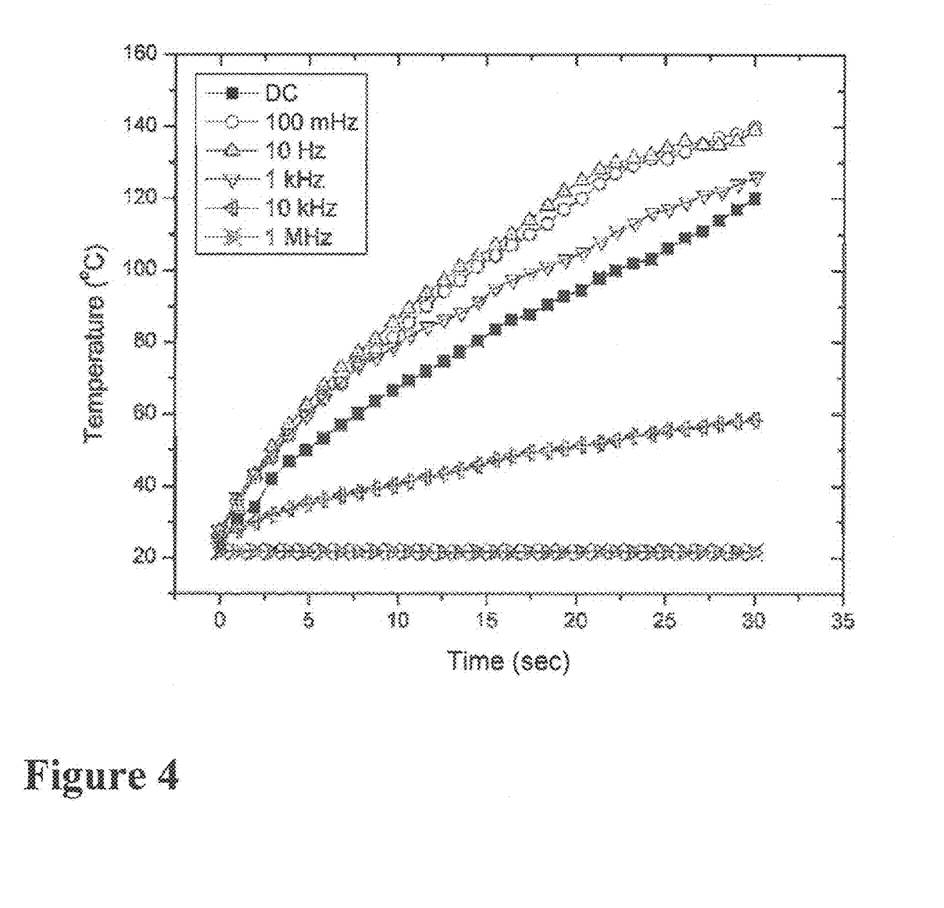
FIG. 4 shows temperature change for a polymer matrix with nano-fillers under applied DC and AC electric fields.

In order to trigger a shape reformation, the temperature of the material should be increased through its glass transition temperature. In this invention, electric power input was employed to increase the temperature of the material instead of a direct heat exposure for the fast response. The temperature of an exemplary LaRC-SMPC was monitored with an IR camera while applying DC voltage and AC voltage in the frequency range from 0.1 Hz to 1 MHz (as shown in FIG. 4). The LaRC-SMPC exhibited a faster increase in temperature change under applied AC voltage below 1 kHz compared to applied DC voltage and AC voltage over 1 kHz. This indicates that the synergistic effect of combining loss heating (generated by dielectric losses from dipole orientation, under applied AC electric field) and Joule heating (generated by electrical currents) can boost the triggering of shape reformation. Accordingly, excellent results are expected from the invention when DC or AC voltage is applied at least a frequency above about 1 µHz.

Figure 5:
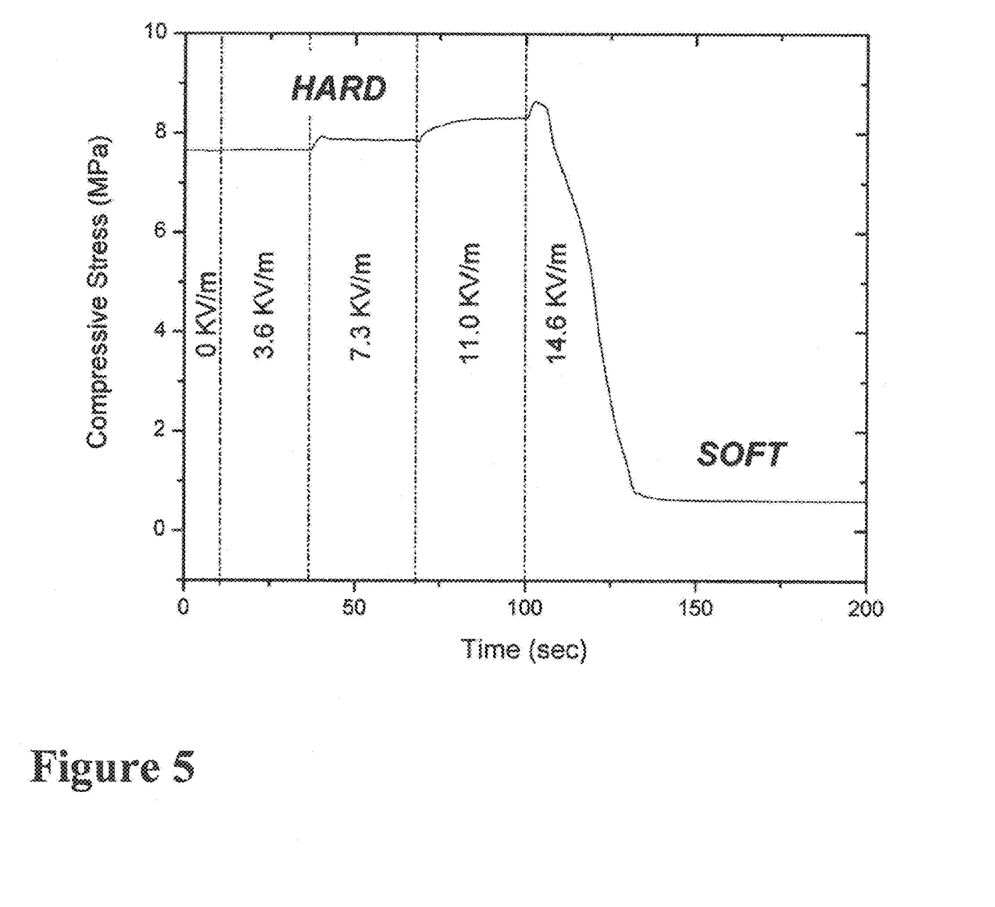
FIG. 5 shows mechanical stiffness changes for a polymer matrix with nano-fillers under applied DC electric field.

FIG. 5 shows variable stiffness capability of the LaRC-SMPC by applying an electric field. The compressive stress increased slightly with increasing applying electric field until a critical transition point, e.g. about 15 kV/m for this test specimen. With further increase of the electric field, the compressive stress dramatically dropped to transform the material from a hard state to a soft state.

Figure 6:
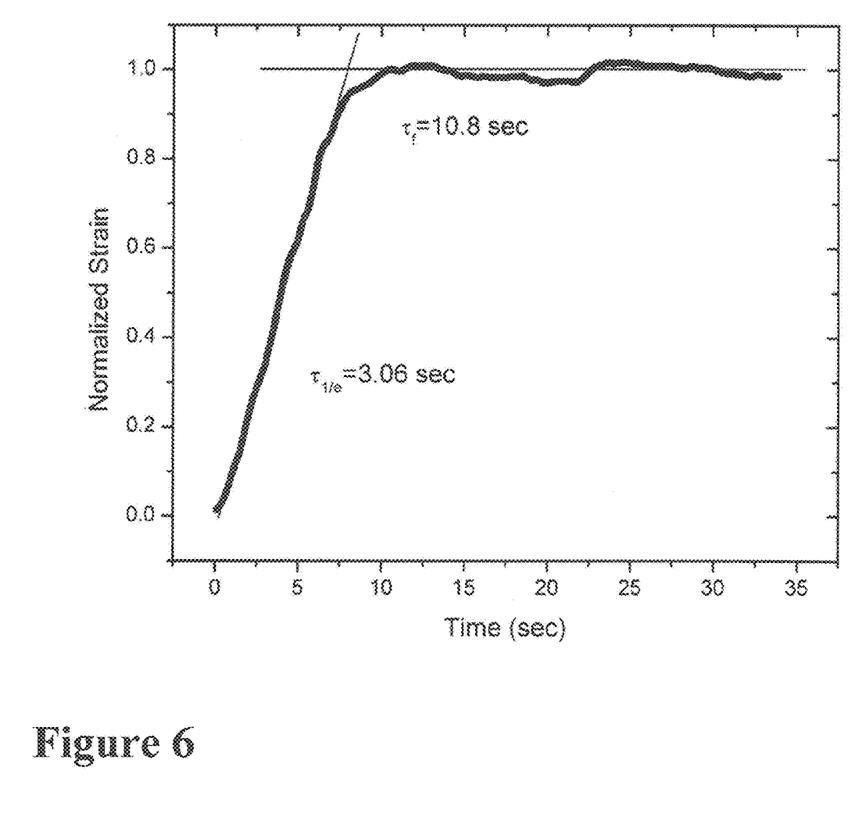
FIG. 6 shows response time for transition from a temporary to a permanent shape of a titanium sheet laminated polymer matrix with nano-fillers.

The response time of an exemplary LaRC-SMPC was improved by laminating an exemplary elastic titanium sheet as shown in FIG. 6. The final reformation time ($\tau_f$) from temporary shape to original permanent shape of the LaRC-SMPC laminated with the elastic titanium alloy sheet (i.e. in this instance, Ti 6Al-4V) was about 10.8 sec which is much faster than that of an un-laminated LaRC-SMPC (where $\tau_f$ was about 37.8 sec, which is not shown). An increased recovery stress can be expected with a higher stored elastic energy of the laminated layer.

Figure 7A:
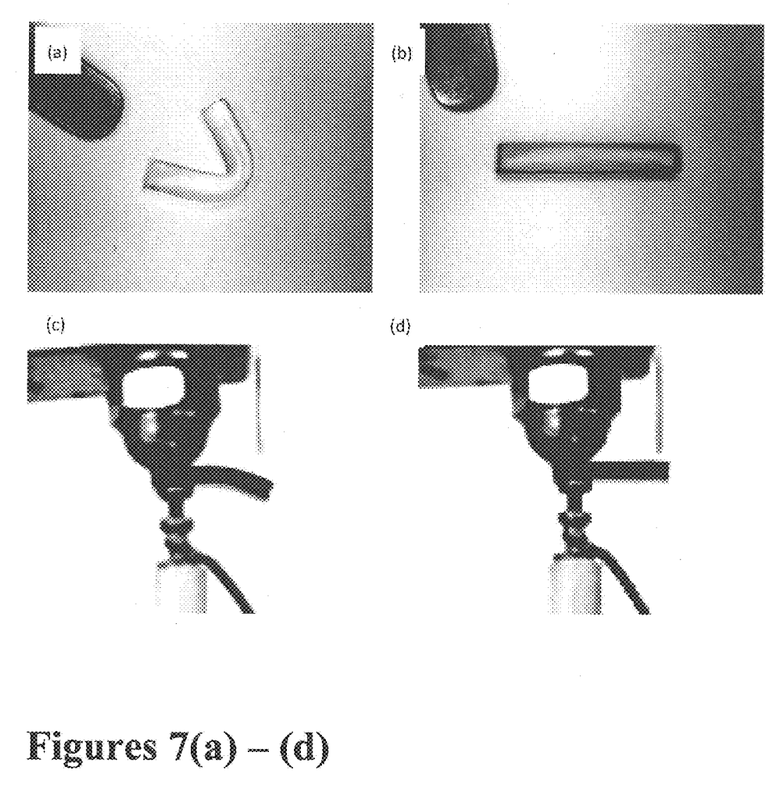

FIG. 7 presents the visual demonstration of shape memory effect of developed LaRC-SMP and LaRC-SMPC. The programmed temporary shape of pristine. LaRC-SMP (FIG. 7(a)) was reformed to the original permanent shape by an external thermal heating (FIG. 7(b)). The programmed temporary shape of the LaRC-SMPC (FIG. 7(c)) was recovered to the original permanent shape by applying an external electric field (FIG. 7(d)).

Aircraft noise reduction is an application of current interest for which the LaRC-SMP and LaRC-SMPC materials show significant potential. Specifically, the aeroacoustic noise produced by the unsteady aerodynamic flow about the leading-edge high-lift device, i.e., leading-edge slat, of typical transport-aircraft wings is of particular interest. A graphic of the typical flow characteristics in the vicinity of this airframe structure is shown in FIG. 8 and a description follows.

Figure 8:
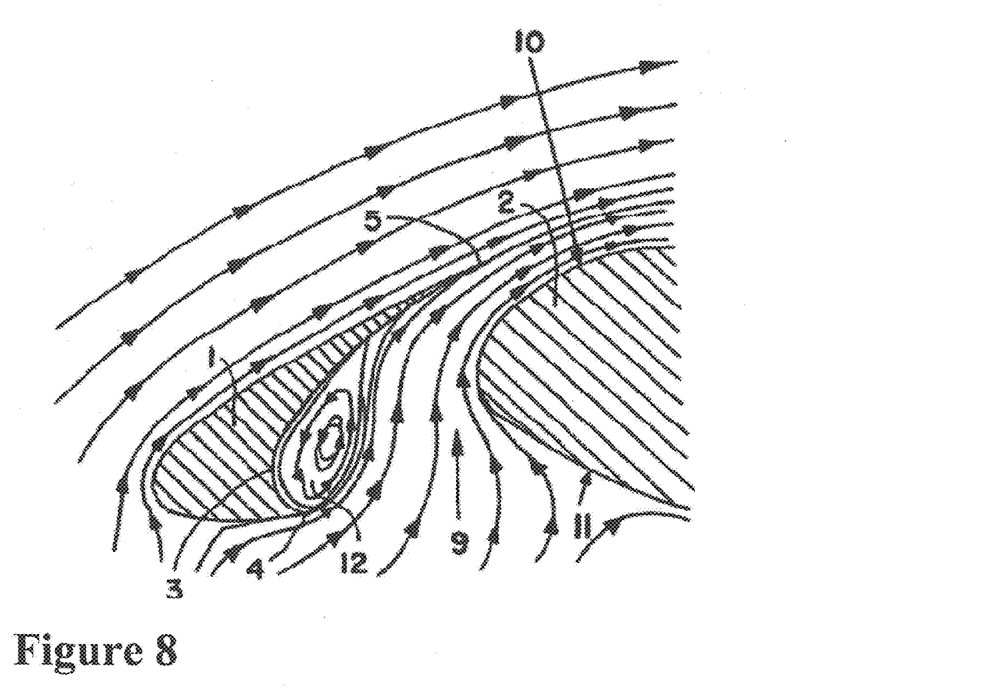
FIG. 8 shows illustrative streamlines in the flat region of a conventional airfoil.
Figure 9:
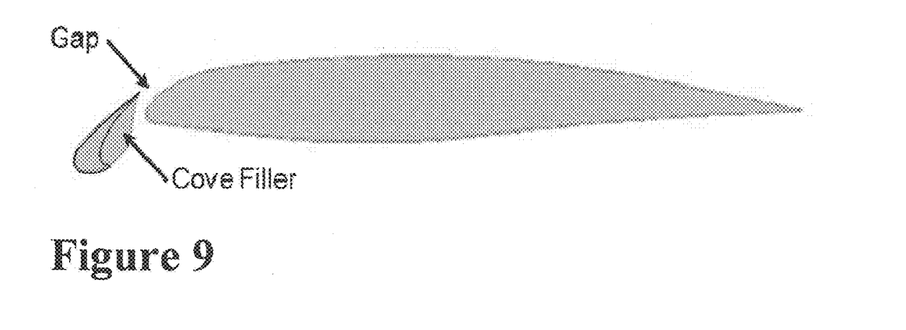
FIG. 9 shows a representative main wing and leading-edge slat geometry with notional slat cover filler.

The free-stream flow splits at the stagnation point on the leading surface of the slat, which is in the vicinity of the numeral 3 in FIG. 8. The flow progressing on the lower side of the slat (pressure side) separates at the cusp, location 4 in FIG. 8, and the resulting shear layer reattaches on the tower surface of the upper part of the slat, forward of the trailing edge. Vortical re-circulating flow develops in the cove region, of the slat, forward of the shear layer and indicated by 12 in FIG. 8. The separated shear layer at the cusp produces large-scale flow structures that support the unsteady fluctuating field. Interaction of the large-scale flow structures accelerating through the gap with the vortical recirculation fluctuations in the reattachment of the shear layer in the slat cove and flow energy conversion as the reattached shear layer separates from the trailing edge are known sources of airframe noise. It is conventionally understood to be desirable for aerodynamic reasons to maintain the gap between the slat and main wing. Filling the slat cove is one method that has been shown, computationally and experimentally, to reduce the unsteady aerodynamics and, thus, the aeroacoustic noise. See, for example, C. L. Streett, et al., AIAA Paper 2006-212 (2006); T. Imamura, et al., AIAA Paper 2007-3473 (2007), which are incorporated herein by reference. Representative slat and main wing geometry, along with a notional slat-cove filler (SCF) profile, is shown in the deployed configuration in FIG. 9.

The challenge of designing a SCF is that the extensive structure must take the proper shape and sustain the aerodynamic load in the deployed configuration while allowing the slat to fit tightly against the main wing element and simultaneously impose no alteration to the outer mold line of the airfoil in the retracted configuration. The most direct and least obtrusive way to stow the SCF structure in the retracted configuration is to contain it within the volume between the slat and main-wing element. Other desirable attributes for an effective SCF design include low weight, high autonomy (low dependence upon hydraulics, pneumatics or other support systems), high durability, and high maintainability. The approach of the instant invention is that of a deformable SCF structure that stows in the cavity between the slat and main wing element under the authority of the slat actuators and deploys automatically with deployment of the slat via the shape memory effect of LaRC-SMPC.

The unique characteristics of the LaRC-SMP and LaRC-SMPC materials are envisioned to be employed to enable an active SCF structure in at least one embodiment as follows. The material would be molded in the "permanent" shape to match that of the deployed SCF profile and the resulting structure would be attached to the cove of the slat. A chord-wise array of electrodes would be applied to the SCF structure to enable independent electrical addressability in the chord-wise direction. During retraction, the SCF structure is electrically addressed and, thus, softened starting in the forward part of the structure and progressing aft. Retraction of the SCF is "scheduled" in this manner to force it into the slat cove in a particular, desirable configuration. The SCF is also softened from the forward section and progressing aft during deployment so that the SCF structure will return to its permanent shape and become rigid as it leaves the main element and before being exposed to significant aerodynamic load. More details on aspects of use of the instant invention as SCF, can be found, inter alia, in co-pending U.S. patent application Ser. No. 13/277,859, filed on Oct. 20, 2011, which is herein incorporated by reference in its entirety.

Figure 10:
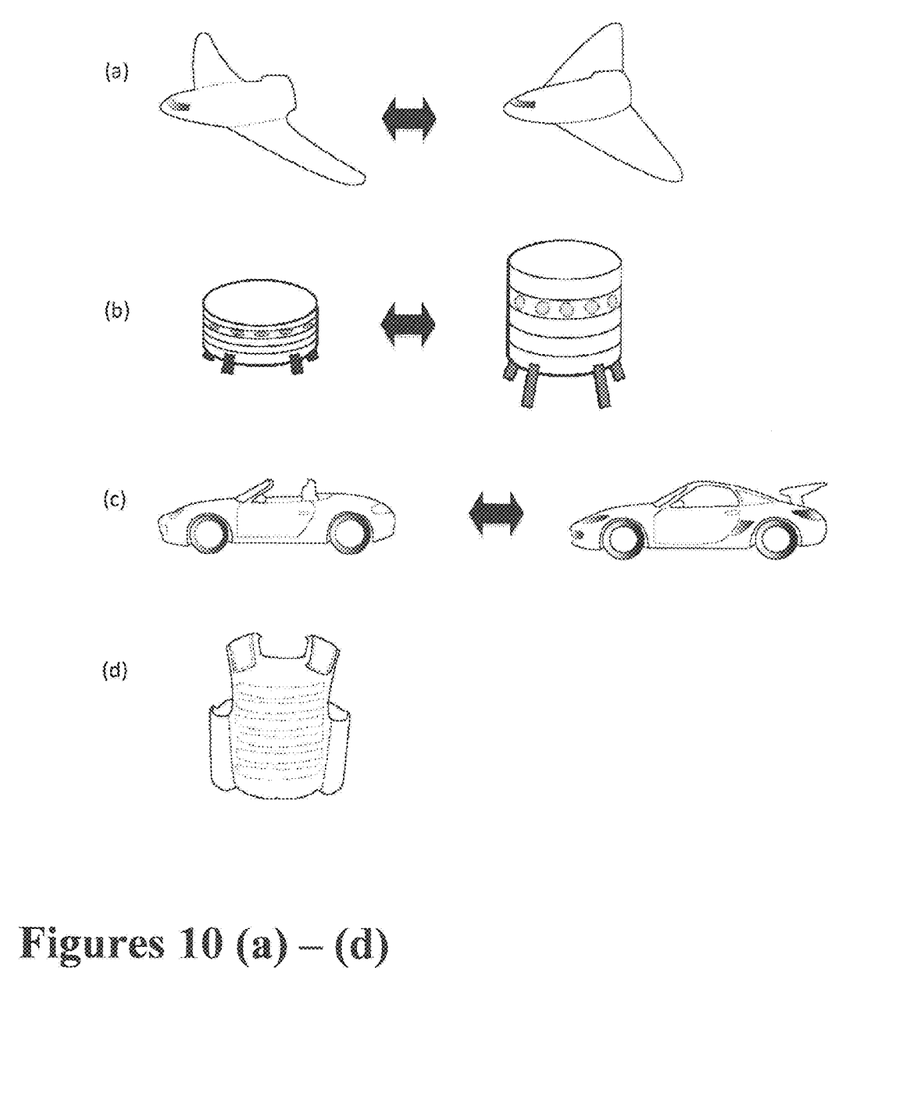
FIGS. 10(a)-(d) show various exemplary applications for the shape memory composite of the present invention, including (a) morphing air/or spacecraft, (b) self-deployable space-habitat, (c) morphing vehicles and (d) variable stiffness body armor.

FIG. 10 presents various exemplary applications of LaRC-SMPC. The variable stiffness and shape adaptive properties enable to create morphing spacecraft (FIG. 10(a)), self-deployable space habitat structure (FIG. 10(b)), morphing vehicles (FIG. 10(c)), and smart armor for space/military applications (FIG. 10(d)).

The following examples further illustrate the invention but, of course, should not be construed as in any way limiting its scope.

EXAMPLE

This example demonstrates at least one aspect of the invention. Beginning with Bisphenol A diglycidyl ether that was purchased from Aldrich Chemical Co., it was used without further purification. Reduced graphene oxide (RGO) sheets were obtained from Vorbeck Materials Co. Thus, epoxy based thermosetting shape memory polymer resin as synthesized with bisphenol A diglycidyl ether as a resin and aromatic amines as the curing agent. The precursors were mechanically premixed and a predetermined amount of RGO was added to the resin, e.g. about 2 wt %. The premixed resin was placed in a mixing apparatus consisting of a temperature controlled sonication bath and a mechanical stirrer. The resin was mixed under high shear at 60° C. and 25 kHz sonication for 2 hours. After mixing, the composite resin was poured into a Teflon mold and cured in a convection oven at 125° C. for 4 hours, 150° C. for 4 hours and 175° C. for 2 hours. Properties were measured with the following instrumentation.

Instrumentation: Differential scanning calorimetry (DSC, Setaram DSC 131, France) was used to determine the glass transition temperature at a heating rate of 10° C./min.

Figure 11:
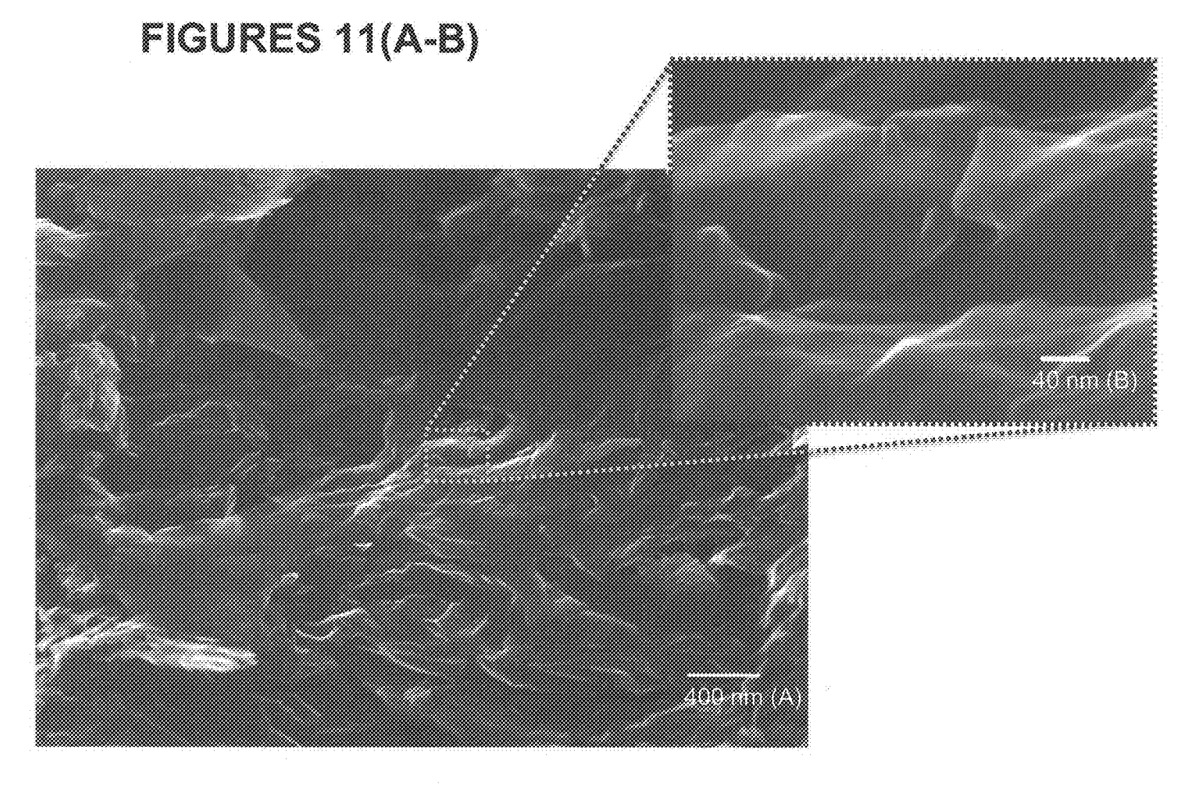
FIGS. 11(a)-(b) show a well dispersed functionalized graphene sheets filled polymer resin matrix in a cryogenically fractured cross-section SEM image with (a) 400 nm scale marker and with (b) 40 nm scale marker enlargement.

Mechanical properties at room temperature and temperatures above the glass transition temperature were measured using a microtester (Instron 5848) with a standard temperature chamber (C9100606). The AC conductivity and the dielectric constant of LaRC-SMPC film were measured as a function of frequency with a Novocontrol-Solartron 1260 impedance/gain-phase analyzer. The electric-field-activated shape memory effect was controlled using a Hewlett Packard 33120A function generator and a Trek 50/750 HV power supply. FIG. 11 shows well dispersed functionalized graphene sheets (RGOs) in the shape memory polymer resin. Accordingly, a new composition of shape memory thermosetting polymer was synthesized with conductive functionalized graphene sheets (RGO) to enhance its thermo-mechanical characteristics, especially when used with a laminated layer in accord with at least some of the preferred embodiments of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve, as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electrically activated shape memory polymer composite capable of thermal shape reformation from a temporary shape to an original permanent shape using electric power to heat the composite through its matrix glass transition temperature, said composite comprising:
   (a) an adaptable polymer matrix component comprising a diglycidyl ether resin and at least one curing agent, wherein the adaptable polymer matrix component has a glass transition temperature from about 60° C. to about 170° C.;
   (b) at least one substantially well-dispersed conductive nano-filler component comprising at least one nano-filler selected from the group consisting of reduced graphene oxide sheets, carbon nanotubes, and combinations thereof, wherein the amount of the at least one nano-filler is about 1 to about 5 wt % of the adaptable polymer matrix component;
   (c) at least one elastic laminated layer comprising a sheet selected from the group consisting of a silicone elastomer, an elastic metal alloy, and combinations thereof; and
   (d) wherein the at least one curing agent is selected from the group consisting of benzhydrylamine 3,4'-oxydianiline (3,4'-ODA), and combinations thereof;
   wherein the composite is characterized as having the nano-filler dispersed throughout the adaptable polymer matrix component, and the adaptable polymer matrix having at least one external side contacting the elastic laminated layer, and wherein the elastic laminated layer stores elastic energy when the composite is in the temporary shape to thereby reduce a reformation time for transitioning from the temporary shape to the original permanent shape.

2. The electrically activated shape memory polymer composite of claim 1, wherein the adaptable polymer matrix component comprises bisphenol A diglycidyl ether (2,2-Bis (4-glycidyloxyphenyl)propane).

3. The electrically activated shape memory polymer composite of claim 1, wherein the nano-filler comprises reduced graphene oxide sheets.

4. The electrically activated shape memory polymer composite of claim 3, wherein the reduced graphene oxide sheets are characterized as entirely dispersed and having a wrinkled morphology that prevents re-aggregation of single-sheets.

5. The electrically activated shape memory polymer composite of claim 4, wherein the reduced graphene oxide sheets are present in an amount of about 2 wt % of the total adaptable polymer matrix component.

6. The electrically activated shape memory polymer composite of claim 1, further characterized with a variable stiffness transition point at about 15 kV/m of applied electrical energy to the total composite less any of the elastic layer(s).

7. The electrically activated shape memory polymer composite of claim 1, wherein the composite is further characterized as subject to electric power using AC at a frequency between about 0.1 Hz to about 1 kHz.

8. The electrically activated shape memory polymer composite of claim 1, wherein the electric power applied causes both loss heating generated by dielectric losses under an applied AC electric field and joule heating generated by electric currents.

9. An electrically activated shape memory polymer composite capable of thermal shape reformation from a temporary shape to an original permanent shape using electric power to heat the composite through its matrix glass transition temperature, said composite comprising:
   (a) an adaptable polymer matrix component comprising a diglycidyl ether resin and at least one curing agent, wherein the adaptable polymer matrix component has a glass transition temperature from about 60° C. to about 170° C.;
   (b) at least one substantially well-dispersed conductive nano-filler component comprising at least one nano-filler selected from the group consisting of reduced graphene oxide sheets, carbon nanotubes, and combinations thereof;
(c) at least one elastic laminated layer comprising a sheet selected from the group consisting of a silicone elastomer, and elastic metal alloy, and combinations thereof; and
(d) wherein the at least one curing agent is selected from the group consisting of benzhydrylamine 3,4'-oxydianiline (3,4'-ODA), and combinations thereof;
wherein the adaptable polymer matrix has at least one external side contacting the elastic laminated layer, wherein the elastic laminated layer stores elastic energy when the composite is in the temporary shape to thereby reduce the reformation time for transitioning from the temporary shape to the original permanent shape.

10. The electrically activated shape memory polymer composite of claim 9, wherein the adaptable polymer matrix component comprises bisphenol A diglycidyl ether (2,2-Bis (4-glycidyloxyphenyl)propane).

11. The electrically activated shape memory polymer composite of claim 10, wherein the adaptable polymer matrix component has a glass transition temperature of about 96° C.

12. The electrically activated shape memory polymer composite of claim 9, wherein the nano-filler comprises reduced graphene oxide sheets.

13. The electrically activated shape memory polymer composite of claim 12, wherein the reduced graphene oxide sheets are characterized as entirely dispersed and having a wrinkled morphology that prevents re-aggregation of single-sheets.

* * * * *